United States Patent
Raman et al.

(10) Patent No.: US 8,356,252 B2
(45) Date of Patent: Jan. 15, 2013

(54) SYSTEM AND METHOD FOR PROVIDING A COMPUTER DISPLAY FORM LAYOUT

(75) Inventors: Vinod Kumar Raman, Bangalore (IN); Prashanth DS, Bangalore (IN); Chandrasekaran Venkatasubbiah, Bethlehem, PA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 760 days.

(21) Appl. No.: 12/552,363

(22) Filed: Sep. 2, 2009

(65) Prior Publication Data
US 2011/0055737 A1    Mar. 3, 2011

(51) Int. Cl.
*G06F 3/00* (2006.01)
(52) U.S. Cl. .......... 715/762; 715/733; 715/780; 715/243
(58) Field of Classification Search .............. 715/705, 715/733, 738, 762, 763, 764, 765, 780, 781, 715/967, 221, 234, 243
See application file for complete search history.

(56) References Cited

U.S. PATENT DOCUMENTS

| | | | |
|---|---|---|---|
| 2004/0181749 A1* | 9/2004 | Chellapilla et al. | 715/505 |
| 2004/0190790 A1* | 9/2004 | Zuev et al. | 382/291 |
| 2007/0162891 A1* | 7/2007 | Burner et al. | 717/115 |
| 2010/0161460 A1* | 6/2010 | Vroom et al. | 705/31 |

\* cited by examiner

*Primary Examiner* — Xiomar L Bautista
(74) *Attorney, Agent, or Firm* — Kaplan Breyer Schwarz & Ottesen LLP

(57) ABSTRACT

A system and method are disclosed that may provide a graphical user interface (GUI) within a web page on a display device forming part of a computer system, that may include defining attributes of user interface fields for use within the graphical user interface for display on the display device with program code; searching at least one image file for image data fields corresponding to one or more of the user interface fields; recording layout data of selected ones of the image data fields within the image file; and generating the GUI using information from the user interface field attributes and the recorded data.

13 Claims, 6 Drawing Sheets

FIG. 2

XML SCHEMA

FIELD A:   DATE

(1) Minlength = 5, Maxlength = 8

(2) DATA TYPE:      Alphabetic-Tab-Numeric (3) VALID NUMERIC VALUE RANGE:   0-9

(4) NUMERIC DATA FORMAT:      YY-MM-DD

FIELD B:   AGE

(1) Minlength = 4, Maxlength = 6

(2) DATA TYPE:      Alphabetic-Tab-Numeric (3) VALID NUMERIC VALUE RANGE:   0-9

(4) NUMERIC DATA FORMAT:      AA

FIG. 3

| LAYOUT/ ALIGNMENT | |
|---|---|
| ALIGNMENT/A: | Left |
| HELP TEXT/ A | Enter double-digit representations for year, then month, and then date |
| ALIGNMENT/B: | Right |
| HELP TEXT/ B | Enter age as of date stated in this document |

QUESTIONNAIRE

DATE: 09-03-31          AGE: 35

HEIGHT: 6 FT; 2 IN.     WEIGHT: 180 LBS.

FIG. 5

| USER DATA ENTRY | | | |
|---|---|---|---|
| DATE: YY-MM-DD | | AGE: AA | |
| FIELD 3: XXXX | | FIELD 4: XXXX | |
| FIELD 5: XXXX | | FIELD 6: XXXX | |

SYSTEM AND METHOD FOR PROVIDING A COMPUTER DISPLAY FORM LAYOUT

BACKGROUND OF THE INVENTION

The present invention relates in general to generating a layout for a page on a computer display and in particular to generating a layout for forms useable within a web-based graphical user interface.

XML (Extensible Markup Language), a subset of the Standard Generalized Markup Language (SGML), is the universal format for data on the World Wide Web. With XML, users can create customized tags that enable the definition, transmission, validation, and interpretation of data between applications and between individuals or groups of individuals. XML is a complementary format to Hypertext Markup Language (HTML) and is similar to HTML, as both contain data useable for describing the contents of a data field, from a single line data entry up to a page or complete data file.

Generating an effective Graphical User Interface (GUI) usually requires two main sets of specification data. First, an XML schema is used to specify attributes of each subset (such as a data field) of a web page, such attributes including, for example, length, data type, and format. Second, a layout file may be provided to define a geometric mapping of the respective data fields within the web page user interface. Such layout information may be generated from algorithms based on the attributes of the individual data fields, or other criteria incorporated into a web page generation tool.

Existing methods for generating layout information impose a computational burden on one or more computing systems responsible for generating the desired user interface. Moreover, the resulting layout may not necessarily end up being user friendly. Accordingly, there is a need in the art for a simpler and more reliable system and method for providing layout information for a computer user interface.

SUMMARY OF THE INVENTION

According to one aspect, the present invention provides a method for providing a graphical user interface (GUI) within a web page on a display device forming part of a computer system, that may include defining attributes of user interface fields for use within the graphical user interface for display on the display device with program code; searching at least one image file for image data fields corresponding to selected respective ones of the user interface fields; recording layout data of selected ones of the image data fields within the image file; and generating the GUI using information from the user interface field attributes and the recorded data.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 2 is a block diagram showing exemplary XML schema for various user interface fields in accordance with an embodiment of the present invention;

FIG. 3 illustrates an exemplary XML layout file showing alignment and text help information useable for selected user interface fields in accordance with an embodiment of the present invention;

FIG. 4 is an illustration of the contents of an exemplary image file that may be used as a source of relative positioning data for the user interface fields of a graphical user interface deployed within a web page in accordance with an embodiment of the present invention;

FIG. 5 is an illustration of an exemplary web-based graphical user interface generated employing XML schema data, XML layout file data, and data from the contents of the image file of FIG. 4 in accordance with an embodiment of the present invention.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. Phrases such as "in one embodiment" or "in an embodiment" recited in various places in the specification do not necessarily all refer to the same embodiment.

Figure 1:
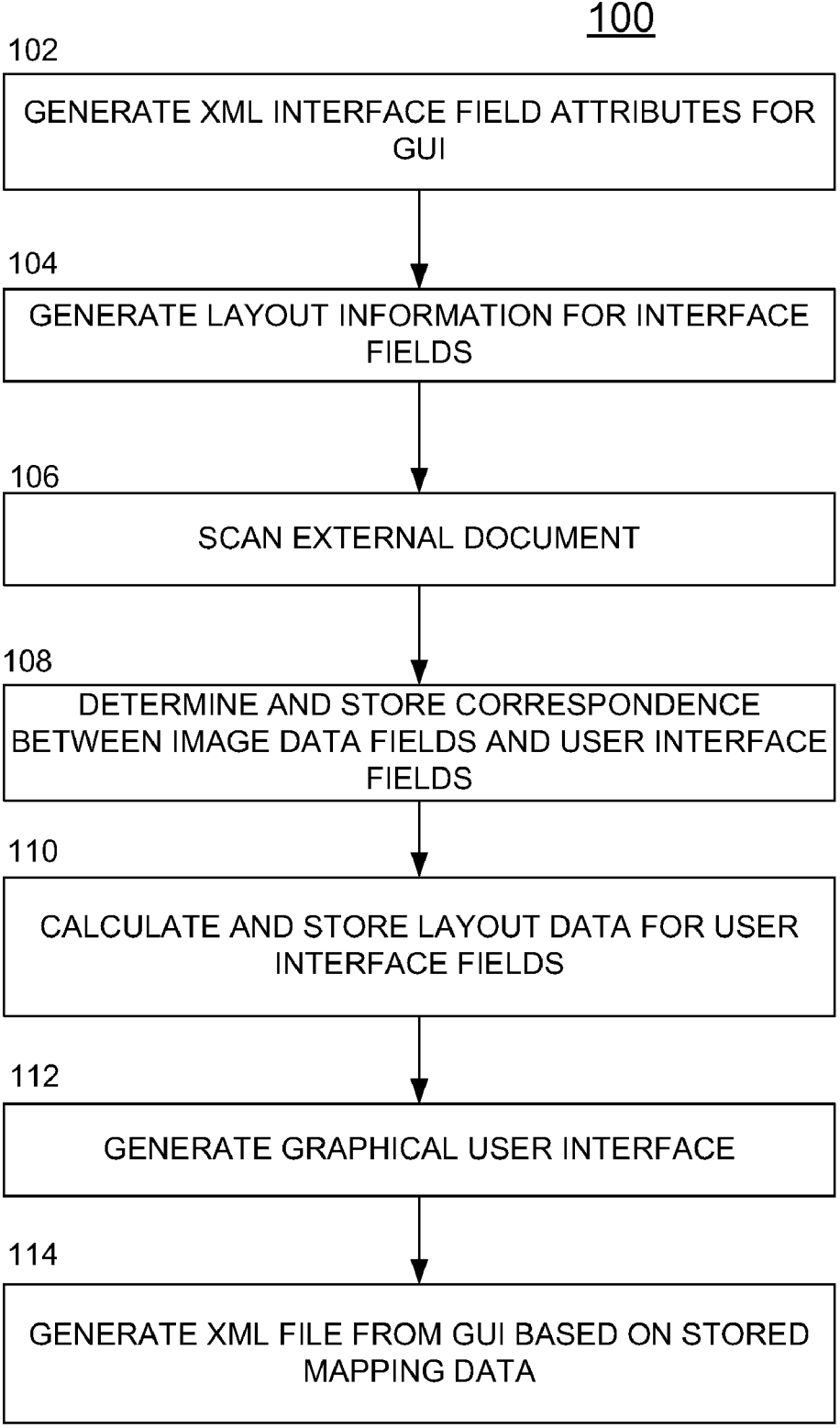
FIG. 1 is a flowchart of a sequence of steps that may be practiced in accordance with an embodiment of the present invention.

FIG. 1 is a flowchart 100 of a sequence of steps that may be practiced in accordance with an embodiment of the present invention.

The method and system herein may use three parameters as inputs for generating user interface fields in a GUI displayed on a computer display device (such as display device 620) deployed within a computer system, such as computer system 600. The GUI may be made available over the Internet, thus enabling interaction with the GUI by any computer connected to the Internet. The method illustrated in FIG. 1 may receive as data inputs: (1) XML schema used to define user interface fields or widgets to be displayed within the GUI; (2) alignment data and/or text help data related to the fields and/or widgets that may be provided within an XML layout file; and/or (3) position data of image data fields gleaned from an external document, such as, but not limited to a PDF or Excel document, Image or other suitable document that is preferably in electronic form. The method disclosed herein preferably obviates the need to implement an algorithm to calculate and generate the relative positioning of the various XML user interface fields. This preferably simplifies the GUI layout file generation process. Moreover, subsequent generation of PDF documents, or other image file format documents, is simple and generally does not require executing any additional program code.

At step 102, XML schema are used to identify attributes for user interface fields for the GUI. Attributes of the user interface fields identified in this manner may include a) length; b) data type (text, numeric, etc.); c) valid values (such as a range of possible numeric values, alphabetic values, or the names of the states of a country that a field prompts a user for); and/or d) data formats (such as, for instance specifying the distribution of characters used to identify a date or age).

At step 104, an XML layout file may be used to identify further attributes of the user interface fields, including (a) a mapping, i.e. correlation, of layout file attributes to user interface fields defined with XML schema elements; (b) an alignment indicator to specify the left or right alignment of the field; (c) a tool text indicator to show "Help" information when a computer mouse is moved, upon pressing a keyboard key, or upon the occurrence of one or more other suitable user actions. The XML layout file may further include a field identifier to identify the field in a external document and a conditional indicator to disable or enable the field in the user interface.

At step 106, a program used on computer system 600 may scan an external document to obtain positioning information on fields within the scanned document. The position information may include the position of each field in relation to the document as a whole, i.e. within a image-document-wide coordinate system. Additionally or alternatively, the position information may also include data describing the position of each field in relation to one or more other fields that are located anywhere within the document. For instance, the position information may include information describing the position of a given field in relation to a field adjacent to the given field. However, the present invention is not limited to identifying only the relative positions of adjacent fields.

The external document used in connection with step 106 may be one of a variety of possible documents. For example, computer system 600 may be employ scanner 628 to scan a printed document to obtain data field positional data. In other cases, image data may be obtained from computer files electronically stored in computer storage media, the available document formats including but not limited to PDF and Excel formats. Moreover, other embodiments of the method herein may obtain positional data for the user interface fields from other electronic sources beyond image files.

At step 108, a correspondence between data fields within a source document (whether printed or electronic) and user interface fields to be included in a GUI is preferably established. Preferably, a method according this embodiment compares the attributes of the user interface fields defined in the XML schema to attributes of image fields (also referred to herein as "image data elements") detected in the image document. Upon detecting a match, the method establishes a correspondence between a given XML schema and a particular field in the image document. The method may also store mapping data indicating the relation between various image data fields and their respective matching user interface fields.

Once the correspondence has been determined, the method may store the correspondence data as well as pertinent position data associated with the image document field found having a corresponding XML schema.

To illustrate this point, reference is made to FIGS. 2 and 4. In FIG. 2, the image field labeled "FIELD A" defines a field (i.e. "length") defined with the parameters Minlength=5, Maxlength=8. Thus, upon being presented with an image file, a preferred method will compare fields in the image file with the field attributes defined in the XML schema. Turning to FIG. 4, it may be seen that the upper, left field has five characters and matches the tag name (i.e. "DATE") defined in the XML schema. The eight-character field following the tag name are defined by the "Minlength"/"Maxlength" values defined for that field). Thus, the method may then record that the date field of the image document of FIG. 4 corresponds to "Field A" as defined within the XML schema. The attribute of field name was used in the above example as a mechanism for associating a given XML defined field with an field discovered within an image document. However, it will be appreciated that various other field attributes could be employed to associate an XML defined field with fields present within one or more image documents.

At step 110, a complete set of layout data for the user interface fields to be included in the GUI may be calculated. In one embodiment, information for fully defining the content and placement of a given user interface field within the GUI may include (a) the XML schema defining various attributes including length etc. for each field; (b) XML layout file data specifying alignment data, and/or help text data, among other attributes; (c) relative positional data specifying the placement of user interface fields in relation to one another and/or (d) auto-derivation of GUI positional data from an external document source.

At step 112, the GUI is preferably generated using the XML schema data, the XML layout file information, and the field position information gleaned from the image file (such as a PDF, Excel, or other field type).

At step 114, XML code may be generated from the GUI based on the stored mappings of the various fields to their respective XML schema, XML layout data, and image field positioning data.

Once a given user interface field is rendered in the GUI, a mapping of the given field in relation to a corresponding field in the PDF file, Excel file, or other image document used for establishing field positioning data is stored in a database of a suitable computer system, such as computer system 600. For example, where a PDF file is used to acquire positioning data, the X-Y position of the field within the document and/or with respect to another field may be stored. Where an Excel document is used to establish positioning data for the user interface fields, respective row and column positions for the user interface fields within the GUI may be stored in the database of a suitable computer system. Preferably, the field name generated for the portal will contain the hierarchy of the field in the XML schema.

As a user enters data into the various fields within the GUI, XML code may be automatically generated from the GUI. Placement of files corresponding to the respective user fields may be derived from the names of the respective GUI fields. Automatically generating the XML code as described from GUIs preferably avoids a need for field parsing and preferably allows the use of generic XML generation logic.

Since the mappings between GUI fields and respective corresponding fields located in the PDF or Excel file are stored, this mapping information can be used to pre-populate the PDF or Excel file, using information in the GUI.

An example is now considered with reference to FIGS. 2-5. By way of overview, FIG. 2 shows user interface field attributes defined with XML schema. FIG. 3 shows further attributes of the user interface fields that can be stored in an XML layout file. FIG. 4 depicts an image file, such as a PDF file or Excel file, from which positional data for the user interface fields may be obtained. FIG. 5 shows an exemplary layout of a GUI using data from FIGS. 2-4. The example discussed in the following and illustrated in the Figures is simplified for the sake of brevity. However, it will be appreciated by those having ordinary skill in the art that the concepts discussed in connection with the example may be readily extended to various data field attributes in place of, or in addition to, those employed in this example.

FIG. 2 shows XML schema that define attributes for two fields: a) a date field; and b) an age field. The attributes that define each field are listed. Specifically, the attributes of length, data type, valid numeric value range, and numeric data format are listed for each field. It will be appreciated that, in other embodiments, fewer or more than four attributes of each field may be listed. The attributes listed are preferably beneficial in enabling a method according to an embodiment of the invention to correlate fields defined by the XML schema with fields detected in the image document shown in FIG. 4.

FIG. 3 shows data within an XML layout file. Specifically, exemplary alignment data and help text data is shown for fields "A" and "B" of FIG. 2. It is noted that the letter identifiers "A" and "B" are intended to illustrate a simplified way of mapping the layout attributes shown in FIG. 3 to specific fields for which XML schema data is shown in FIG. 2. Specifically, the "/A" designation indicates that the layout data shown in the upper part of FIG. 3 applies to the Date field, i.e. FIELD A, of FIG. 2. While a simplified form of mapping is shown in FIGS. 2-3, it will be apparent that the mapping concepts shown in FIGS. 2 and 3 may be readily extended to more complex mechanisms for correlating layout attribute data in one file to XML schema attribute data in a separate file that both pertain to the same user interface field.

FIG. 4 depicts an image document from which further layout information may be gleaned to aid in determining the placement of user interface fields in a GUI. The document of FIG. 4 may also be referred to as an "image source document" since the document may be used as a source of relative (and/or absolute) data field positioning data. The process of comparing the XML attribute data to detected image data to produce a GUI is now discussed with reference to FIGS. 2-5.

FIG. 4 shows four fields: a) Date; b) Age; c) Height; and d) Weight. A preferred method preferably detects the attributes of each image data field and then compares the detected attributes to the user-interface-field attributes whose definitions are shown in FIGS. 2-3. The "date" field of FIG. 4 matches the attributes of FIELD A of FIG. 2. Specifically, the length (i.e. five characters, followed by a tab, followed in turn by eight characters) and the data type of the date field match definitions (1) and (2) shown for Field A in FIG. 2. Though less obvious upon visual review, the date field on image document 400 also matches the XML alignment data of FIG. 3 which indicates the left-side alignment of Field A.

Similarly, the "Age" field in image document 400 matches the XML schema information (FIG. 2) and the XML alignment information (FIG. 3) of Field B. Accordingly, a method in accordance with an embodiment of the invention preferably establishes the correspondence between the image data fields of FIG. 4 and XML data, retrieves relative positional data between the Date and Age fields of FIG. 4, and stores the relevant data for future use in generating the GUI. A preferred method may also obtain absolute positional data for the Date and Age fields from the image document of FIG. 4. More specifically, in addition to, or instead of acquiring only the relative positional data of one field with respect to another, the method may obtain absolute X-Y position data for one or more of the fields within the coordinate system of the overall document.

Continuing with the example, the GUI, preferably configured for use with a web browser, may then be generated using the XML information from FIGS. 2-3 and the positional information from FIG. 4. Thus, the Date and Age fields of the GUI of FIG. 5 are generated such that the positioning of the Age field relative to the Date field matches that found in FIG. 4. Moreover, the attributes of each field are preferably established so as to correspond to the definitions provided in the XML schema of FIG. 2.

Since the GUI of FIG. 5 is intended to enable data entry by a user, certain sub-fields whose corresponding image file entries had fixed values (such as "Age" being equal to "35") are presented as variables in FIG. 5 so as to prompt the user to enter a numeric value of the user's choosing.

Additional fields are shown in FIG. 5 not having corresponding fields in the image file of FIG. 4. These additional fields illustrate that the GUI may optionally include fields beyond those found in the image file used for positional data.

Figure 6:
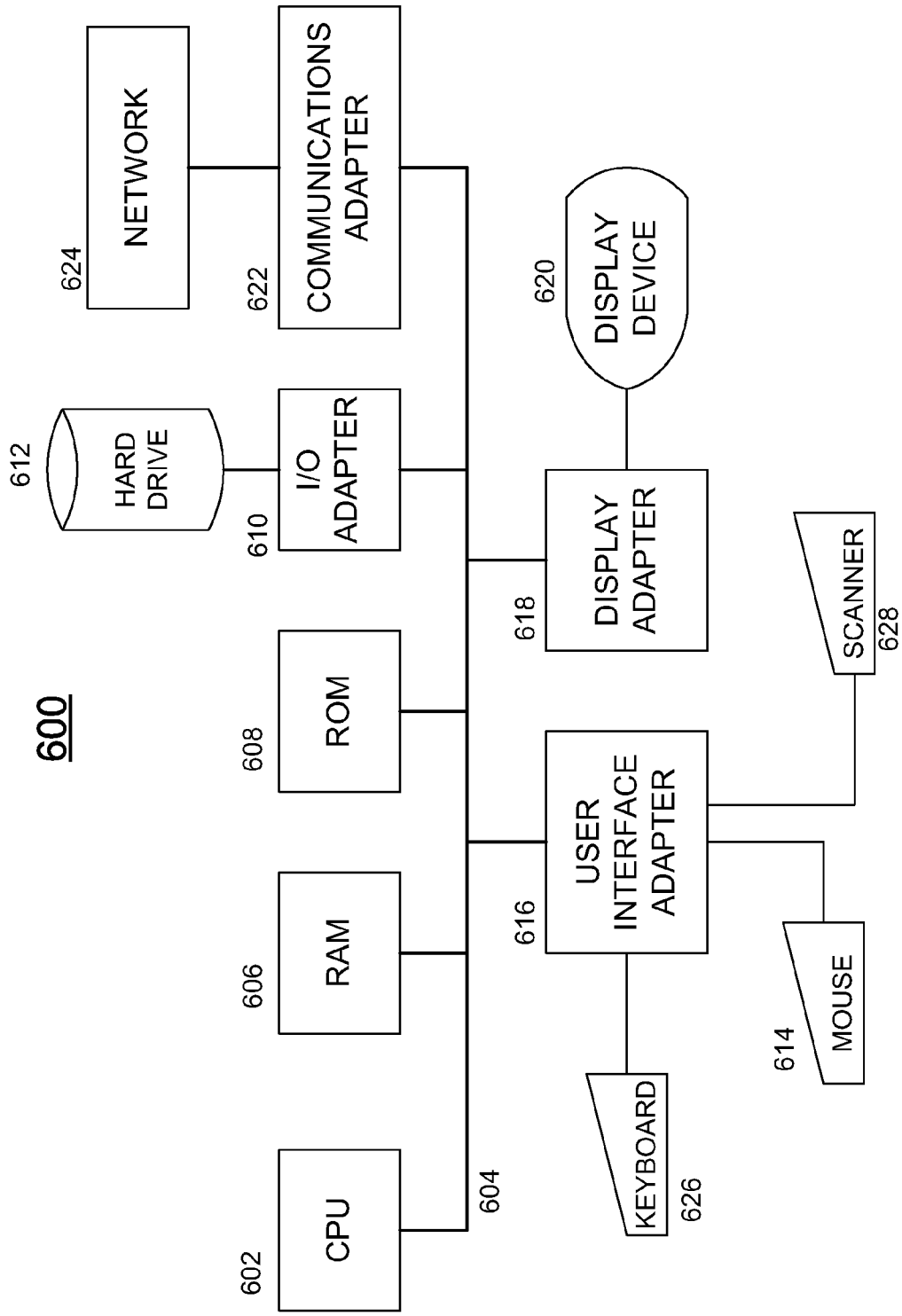
FIG. 6 is a block diagram of a computer system adaptable for use with an embodiment of the present invention.

FIG. 6 is a block diagram of a computing system 600 adaptable for use with one or more embodiments of the present invention. Central processing unit (CPU) 602 may be coupled to bus 604. In addition, bus 604 may be coupled to random access memory (RAM) 606, read only memory (ROM) 608, input/output (I/O) adapter 610, communications adapter 622, user interface adapter 606, and display adapter 618.

In an embodiment, RAM 606 and/or ROM 608 may hold user data, system data, and/or programs. I/O adapter 610 may connect storage devices, such as hard drive 612, a CD-ROM (not shown), or other mass storage device to computing system 600. Communications adapter 622 may couple computing system 600 to a local, wide-area, or global network 624. User interface adapter 616 may couple user input devices, such as keyboard 626, scanner 628 and/or pointing device 614, to computing system 600. Moreover, display adapter 618 may be driven by CPU 602 to control the display on display device 620. CPU 602 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for providing a graphical user interface (GUI) within a web page on a display device forming part of a computer system, comprising:
    defining attributes of user interface fields for use within the graphical user interface for display on the display device with program code;
    receiving an existing source file that includes data fields that correspond to at least one of the user interface fields and wherein a layout of the corresponding data fields in the source file matches an intended layout of the corresponding user interface fields in the GUI;
    searching the existing source file for the data fields corresponding to the one or more user interface fields;
    storing positional data of selected ones of the data fields of the existing source file; and
    generating the user interface fields in the GUI using information from the user interface field attributes and the stored positional data.

2. The method of claim 1 wherein the user interface fields are defined using XML.

3. The method of claim 2 wherein the defining step defines attributes of the user interface fields selected from the group consisting of: a) length; b) data type; c) range of valid values; and d) data format.

4. The method of claim 1 wherein the existing source file is selected from the group consisting of: (a) a PDF file; (b) an Excel file; and (c) an image document.

5. The method of claim 1 wherein the task of searching further comprises:
   detecting attributes of the data fields within the existing source file; and
   comparing the detected attributes of the data fields to the defined attributes of the user interface fields.

6. The method of claim 5 wherein the task of storing further comprises:
   identifying data fields that match respective user interface fields;
   mapping a relation between the identified data fields and the respective matching user interface fields; and
   storing the mapped relation between the matching fields in a database of the computer system.

7. The method of claim 1 wherein the task of generating the GUI further comprises rendering the user interface fields using at least one of:
   a) a mapping between the data fields and matching user interface fields;
   b) an alignment indicator to specify the left/right alignment of the field; and
   c) a tool text indicator to show help in response to mouse motion.

8. A computer storage medium having computer program logic recorded thereon for providing a graphical user interface (GUI) within a web page on a display device forming part of a computer system, the computer storage medium comprising:
   code for defining attributes of user interface fields for use within the graphical user interface for display on the display device;
   code for receiving an existing source file that includes data fields that correspond to at least one of the user interface fields and wherein a layout of the corresponding data fields in the source file matches an intended layout of the corresponding user interface fields in the GUI;
   code for searching the existing source file for the data fields corresponding to the one or more user interface fields;
   code for storing positional data of selected ones of the data fields of the existing source file; and
   code for generating the user interface fields in the GUI using information from the user interface field attributes and the stored positional data.

9. The computer storage device of claim 8 wherein the user interface fields are defined using XML.

10. The computer storage device of claim 9 wherein the code for defining defines attributes of the user interface fields selected from the group consisting of: a) length; b) data type; c) range of valid values; d) data format.

11. The computer storage device of claim 8 wherein the existing source file is selected from the group consisting of: (a) a PDF file; and (b) an Excel file.

12. The computer storage device of claim 8 wherein the code for searching further comprises:
   code for detecting attributes of the data fields within the existing source file; and
   code for comparing the detected attributes of the data fields to the defined attributes of the user interface fields.

13. The computer storage device of claim 12 wherein code for storing further comprises:
   code for identifying image data fields that match respective user interface fields;
   code for mapping a relation between the identified image data fields and the respective matching user interface fields; and
   code for recording the mapped relation between the matching fields in a database of the computer system.

* * * * *